United States Patent
Graves et al.

(10) Patent No.: US 8,428,762 B2
(45) Date of Patent: Apr. 23, 2013

(54) SPIN COATING MODELING

(75) Inventors: John S. Graves, Austin, TX (US); Mark D. Smith, Austin, TX (US); Stewart A. Robertson, Cedar Park, TX (US)

(73) Assignee: KLA-Tencor Corporation, Milpitas, CA (US)

( * ) Notice: Subject to any disclaimer, the term of this patent is extended or adjusted under 35 U.S.C. 154(b) by 266 days.

(21) Appl. No.: 12/855,124

(22) Filed: Aug. 12, 2010

(65) Prior Publication Data
US 2011/0054664 A1    Mar. 3, 2011

Related U.S. Application Data

(60) Provisional application No. 61/238,021, filed on Aug. 28, 2009.

(51) Int. Cl.
*G06F 19/00* (2011.01)

(52) U.S. Cl.
USPC ............... 700/121; 257/415; 438/667

(58) Field of Classification Search ........... 700/121; 257/415; 438/667
See application file for complete search history.

(56) References Cited

U.S. PATENT DOCUMENTS

| | | | |
|---|---|---|---|
| 2005/0064707 A1* | 3/2005 | Sinha | 438/667 |
| 2005/0117272 A1* | 6/2005 | Koutsaroff et al. | 361/306.3 |
| 2007/0164632 A1* | 7/2007 | Adachi et al. | 310/311 |
| 2007/0170595 A1* | 7/2007 | Sinha | 257/774 |
| 2008/0037200 A1* | 2/2008 | Koutsaroff et al. | 361/321.5 |
| 2008/0157235 A1* | 7/2008 | Rogers et al. | 257/415 |

OTHER PUBLICATIONS

Stillwagon et al., "Leveling of thin films over uneven substrates during spin coating," Phys. Fluids A 2 (11), Nov. 1990, pp. 1937-1944.
White, "Approximating spun-on, thin film planarization properties on complex topography," J. Electrochem. Soc, Jan. 1985, pp. 168-172.
White et al., "Topography-induced thickness variation anomalies for spin-coated, thin films," J. Vac. Sci. Technol. B 3 (3), May/Jun. 1985, pp. 862-868.
Wilson et al., "Effect of circuit structure on planarization resist thickness," J. Electrochem. Soc. vol. 133, No. 5, May 1986, pp. 981-984.

* cited by examiner

*Primary Examiner* — Mohammad Ali
*Assistant Examiner* — Anthony Whittington
(74) *Attorney, Agent, or Firm* — Luedeka Neely Group, P.C.; Rick Barnes

(57) ABSTRACT

A method for setting processing parameters for fabricating an integrated circuit, by creating a mathematical model of a spin coated surface of a material over a non-flat substrate surface, where the mathematical model includes, a smoothing algorithm, where the smoothing algorithm uses as inputs only, a nominal thickness of the spin coated surface, a minimum thickness of the spin coated surface, and an interaction length, and a constraint that the spin coated surface cannot intersect the substrate surface, solving the mathematical model to determine the spin coated surface, and using the modeled spin coated surface to set the processing parameters for fabricating the integrated circuit.

10 Claims, 1 Drawing Sheet

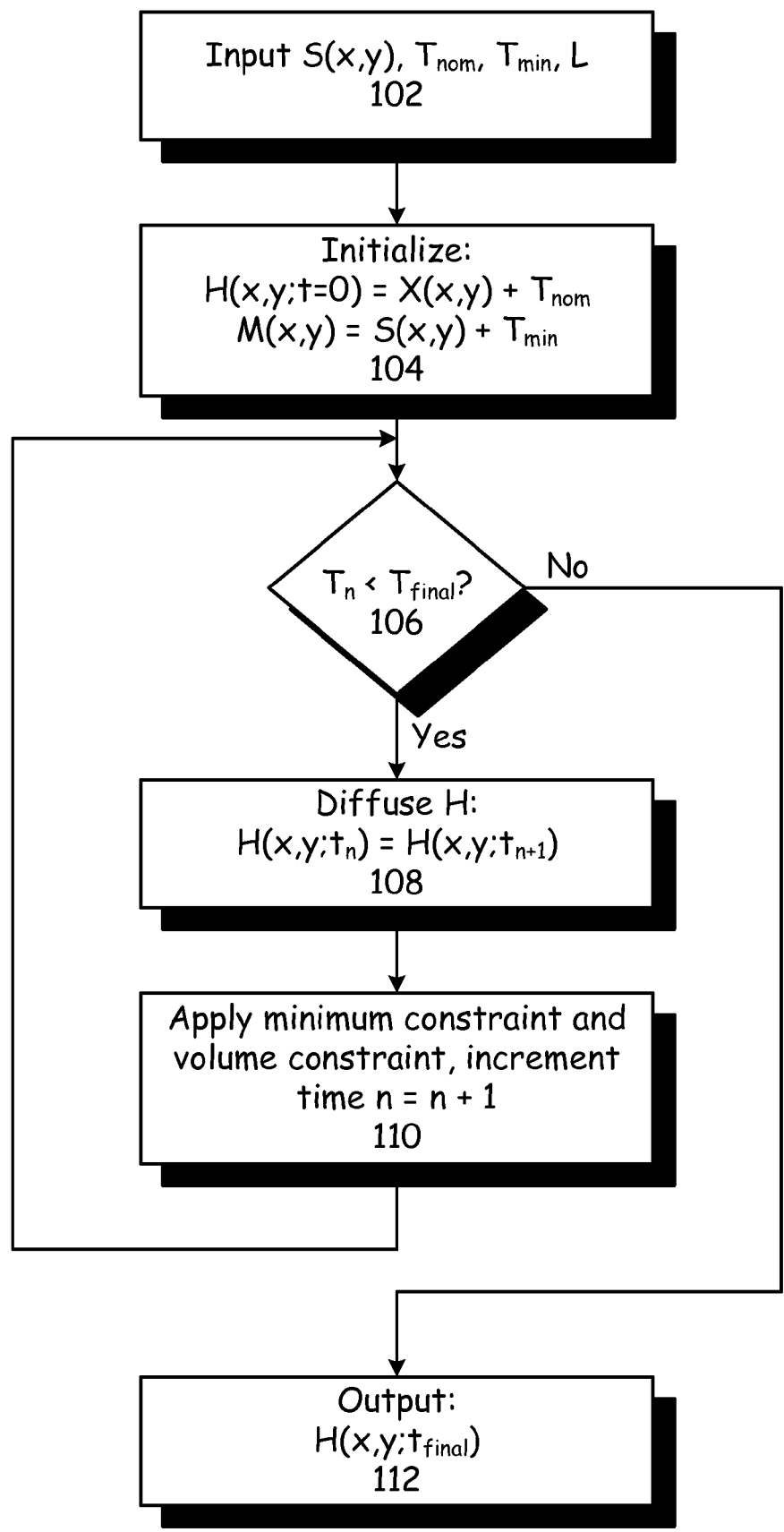

SPIN COATING MODELING

FIELD

This application claims all rights and priority on prior U.S. provisional application Ser. No. 61/238,021 filed 2009.08.28. This invention relates to the field of integrated circuit fabrication. More particularly, this invention relates to generating realistic spin coat surface shapes on non-flat substrates (substrates with topography), such as where the height of the substrate topography is approximately equal to or larger than the nominal thickness of the spin coat layer.

INTRODUCTION

In the fabrication of integrated circuits it is necessary to form very thin layers of materials such as antireflective coatings and resists. As the term is used herein, "integrated circuit" includes devices such as those formed on monolithic semiconducting substrates, such as those formed of group IV materials like silicon or germanium, or group III-V compounds like gallium arsenide, or mixtures of such materials. The term includes all types of devices formed, such as memory and logic, and all designs of such devices, such as MOS and bipolar. The term also comprehends applications such as flat panel displays, solar cells, and charge coupled devices.

Spin coating is the method used to form these thin films—some on the order of about twenty nanometers or less in thickness. The spin coat process begins by dropping a solution of the desired material, dissolved in an appropriate solvent, onto the substrate and spinning the substrate at a high rate (such as about sixty cycles per second for about thirty seconds or more). During the spin process, the solution spreads over the upper surface of the substrate, and much of the solvent evaporates. The substrate is then heated to remove additional solvent and produce a dry film. As used herein, "spin coating" is the complete process to produce a solid film—both the spinning process and the baking process.

For substrates that are perfectly flat, the spin coating process produces a film that is very uniform in thickness across the entire substrate. For substrates that are not flat (substrates with topography), the resulting film may or may not have a uniform thickness, depending upon the height of the surface topography in comparison to the nominal thickness of the spin coat film. The shape of the top surface of the film after spin coating also depends on the chemical composition of the solution, the solvent in the solution, other properties of the initial spin coat solution, spin rate, properties of the device used to spin the substrate, and the properties of the bake process.

In the fabrication of an integrated circuit, only the first step starts with a perfectly flat substrate. For almost all other steps in the fabrication process, the surface topography is not flat, so the result of the spin coat process will generally not be a flat surface of material, or even a surface with uniform thickness across the topography.

Photolithography simulators are capable of accurately modeling the optical, physical and chemical steps that take place in the photolithography step in the microfabrication process. One of the inputs to a photolithography simulator is the location of all of the different features and materials disposed on the substrate, including (but not limited to) deposited films, etched features, anti-reflective coatings, and photoresist coatings. One method for determining the location of the interfaces between these different features and materials is to examine cross sections of the substrate and layers with a microscope. However, this is not always possible or convenient, and there is a need for a simple method to estimate the location of these interfaces so that they can be used for photolithography simulation.

There are several methods for predicting spin coat surfaces. These models generally fall into two categories: physics-based first-principles models, and empirical models. An example of a physics-based model is to solve simplified versions of the equations that describe the motion of viscous fluids, such as the "lubrication approximation" to the Navier-Stokes equations. However, it is required that a large number of physical properties be known in order to solve such equations. These parameters are often unavailable, difficult to measure experimentally, or inconvenient to obtain.

Empirical models typically start with the shape of the underlying topography, and then apply a low-pass filter or some averaging method across nearby areas on the substrate. The parameters for these models are obtained by matching the predicted shape to a small number of experimental cross-sections. Once the required parameters are known, the model is used to predict new cross-sectional shapes without any experimental cross-sectional verification.

What is needed, therefore, is a system that tends to reduce problems such as those described above, at least in part.

SUMMARY OF THE CLAIMS

The above and other needs are met by a method for setting processing parameters for fabricating an integrated circuit, by creating a mathematical model of a spin coated surface of a material over a non-flat substrate surface, where the mathematical model includes, a smoothing algorithm, where the smoothing algorithm uses as inputs only, a nominal thickness of the spin coated surface, a minimum thickness of the spin coated surface, and an interaction length, and a constraint that the spin coated surface cannot intersect the substrate surface, solving the mathematical model to determine the spin coated surface, and using the modeled spin coated surface to set the processing parameters for fabricating the integrated circuit.

In various embodiments of the present invention, the smoothing algorithm includes at least one of a weighted averaging method, a low-pass filter method, a diffusion equation, and a solution of a time-evolution equation that results in smoothing. In some embodiments the constraint for the spin coated surface to not intersect the substrate surface is enforced while solving the smoothing algorithm and not thereafter. In some embodiments the mathematical model further includes a constraint to maintain a constant volume of the material. In some embodiments the constraint for the spin coated surface to not intersect the substrate surface is a function of a volume of the material. In some embodiments the processing parameters include at least one of exposure time, mask feature sizes, coat settings, and stepper settings.

BRIEF DESCRIPTION OF THE DRAWINGS

Further advantages of the invention are apparent by reference to the detailed description when considered in conjunction with the FIGURE, which is not to scale so as to more clearly show the details, wherein like reference numbers indicate like elements, and which is a flow chart of a method according to an embodiment of the present invention.

DETAILED DESCRIPTION

Various embodiments of the current invention employ an empirical model that addresses an important shortcoming of other empirical models. Previously presented empirical models do not explicitly prohibit the intersection of the calculated spin coat surface with the shape of the underlying topography. Physically, this condition corresponds to "dewetting" or "holes" in the coated film. This is typically not a problem for thick films, where the height of the topography is less than the nominal thickness of the coated film. For thin films, however, dewetting is not observed experimentally, so it is desirable and necessary to have a model that avoids intersections between the spin coat surface and the topography surface.

One solution to this problem is to redistribute the spin coat material so that the total volume of material is constant, but no dewetting occurs. In the present embodiments a smoothing type of surface is generated while maintaining two constraints: the topography surface does not intersect the spin coat surface, and the total volume of the coated material is constant as material is distributed.

As generally indicated in the FIGURE, the method 100 uses three input parameters, Tnom, Tmin, and L, as given in block 102. Tnom and Tmin can be determined by standard metrology methods (cross sectional CDSEM). L can be varied in a straightforward manner that best fits the metrology results.

In block 104 the underlying topography surface S(x,y) is added to the constant nominal thickness Tnom of the spin coating material. This sum equals the nominal height H of the coated surface at every point, given by:

$$H(x,y;t=0)=S(x,y)+T_{nom}$$

The second parameter, Tmin, is the minimum desired thickness of the spin coating material, and this is added to S in block 104 to give the minimum height M of the coated surface at every point, given by:

$$M(x,y)=S(x,y)+T_{min}$$

The method 100 solves for the coated surface, until a final time is reached, as given in block 106. When the final time is attained, the final coated surface is output, as given in block 112. If the final time is not attained, then the surface H is iteratively diffused, as given in block 108. At each iteration the minimum thickness constraint and the volume constraint are enforced, and the time is incremented, as given in block 110.

The method solves the diffusion equation, given as:

$$\frac{\partial H(x, y)}{\partial t} = D\left(\frac{\partial^2 H(x, y)}{\partial x^2} + \frac{\partial^2 H(x, y)}{\partial y^2}\right)$$

subject to the following constraints:
1. $H(x,y,t) > M(x,y)$.
2.

$$T_{nom} = \frac{\int\int H(x, y)dxdy}{A}$$

The first constraint is applied because the surface M is considered to be immovable, and the second constraint is applied because the fluid is assumed to spread with the same surface density regardless of the topography of the surface. In the second constraint, the integration is over the entire area of interest, A.

The final parameter in the model is the interaction length L, given as:

$$L=\sqrt{2Dt_{\text{final}}}$$

Where tfinal is the ending time for solution of the above diffusion equation and D is the diffusion coefficient. The choice of D and tfinal are arbitrary if they yield the same value of L (that is to say, they will give the same final surface shape).

There are various ways to solve this problem. One way is to break the diffusion into multiple time steps n=1, 2, ... Nt. At each time step, the requirement that $H(x,y,t) > M(x,y)$ must be checked. This is likely to not be the case for some locations (x,y). Those locations are marked as $\Omega(x,y)$, and are set to equal the minimum, as given by:

$$H(\Omega(x,y);t=t_n)=M(\Omega(x,y))$$

(tn is the time at the nth time step.) One can add the volume constraint that improves the expected behavior: the user specifies a nominal thickness (Tnom) and therefore expects the same volume in the final scenario. To do this, the volume desired is:

$$V=P_xP_yT_{nom}$$

(Px and Py are the pitches, or sizes, in the x and y directions, such that PxPy=A.) The volume after the minimum constraint is applied is found from $$V^*(t=t_n)=P_xP_y(H(x,y;t=t_n)-S(x,y))$$

So the excess volume is $$dV=V^*-V$$

(negative dV indicates a lack of volume.) This volume is then equally distributed over all the points that did not encounter the minimum constraint (labeled $\tilde{\Omega}(x,y)$). Letting $$dH=-dV/\text{Area}(\tilde{\Omega}(x,y))$$

Then $$H(\tilde{\Omega}(x,y);t=t_n)=H(\tilde{\Omega}(x,y);t=t_n)+dH$$

In this manner, all points of the surface satisfy the minimum constraint and conserve volume.

A second approach is to apply the volume constraint as a Lagrange multiplier, which we designate as P, and the minimum height constraint with a penalty method. We now have a pair of equations:

$$\frac{\partial H(x, y)}{\partial t} = D\left(\frac{\partial^2 H(x, y)}{\partial x^2} + \frac{\partial^2 H(x, y)}{\partial y^2}\right) + P + r \cdot \min[0, M(x, y) - H(x, y)]^2$$

$$V = \int\int_A H(x, y)dA$$

The penalty coefficient r can be adjusted in the implementation of the model so that the minimum thickness is approximately satisfied. This type of penalty method is the so-called quadratic loss function. Other techniques for enforcing the constraints are also possible, such as exact loss functions, and so forth.

The spin coat model produced by the present methods is an important part of the lithography simulation. For example, the output H(x,y) of the spin coat model (height as a function of x and y) is used to determine how the exposure of light affects the photoresist. In other words, the spin coat model output is an input to the exposure model. The spin coat model is also used as an input to the post-exposure bake model, and the develop model. The spin coat shape ultimately is needed in order to model (predict) the photoresist pattern and profile after the complete lithography process.

Without an accurate spin coat model (and suitable parameters), the photoresist pattern cannot be simulated. With an accurate model and input data, a user can run simulations and determine the best way to print the desired pattern. The user can adjust actual process settings (such as exposure time, mask feature sizes, coat settings, stepper settings) and achieve the desired results. Without an accurate spin coat model, this could only be accomplished in the fab through trial and error, at the expense of time and materials. Thus, the spin coat model is used to determine appropriate exposure settings, development times, and so forth.

The foregoing description of embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for setting processing parameters for fabricating an integrated circuit, the method comprising the steps of:
    creating a mathematical model of a spin coated surface of a material over a non-flat substrate surface, where the mathematical model includes,
        a smoothing algorithm, where the smoothing algorithm uses a inputs only,
            a nominal thickness of the spin coated surface,
            a minimum thickness of the spin coated surface, and
            an interaction length, and
        a constraint that the spin coated surface cannot intersect the substrate surface,
    solving the mathematical model to determine the spin coated surface, and
    using the modeled spin coated surface to set the processing parameters for fabricating the integrated circuit,
    wherein the smoothing algorithm is given by, $$\frac{\partial H(x,y)}{\partial t} = D\left(\frac{\partial^2 H(x,y)}{\partial x^2} + \frac{\partial^2 H(x,y)}{\partial y^2}\right),$$

where t is time, H(x,y) is the substrate surface plus the nominal thickness, and D is diffusion coefficient.

2. A method for setting processing parameters for fabricating an integrated circuit, the method comprising the steps of:
    creating a mathematical model of a spin coated surface of a material over a non-flat substrate surface, where the mathematical model includes,
        a smoothing algorithm, where the smoothing algorithm uses as inputs only,
            a nominal thickness of the spin coated surface,
            a minimum thickness of the spin coated surface, and
            an interaction length, and
        a constraint that the spin coated surface cannot intersect the substrate surface,
    solving the mathematical model to determine the spin coated surface, and
    using the modeled spin coated surface to set the processing parameters for fabricating the integrated circuit,
    wherein the smoothing algorithm is given by, $$\frac{\partial H(x,y)}{\partial t} =$$
$$D\left(\frac{\partial^2 H(x,y)}{\partial x^2} + \frac{\partial^2 H(x,y)}{\partial y^2}\right) + P + r \cdot \min[0, M(x,y) - H(x,y)]^2$$
$$V = \int\int_A H(x,y) dA,$$

where t is time, H(x,y) is the substrate surface plus the nominal thickness, P is a Lagrange multiplier, r is a penalty coefficient that can be adjusted to satisfy the minimum thickness, M(x,y) is the substrate surface plus the minimum thickness, A is area, V is volume, and D is diffusion coefficient.

3. The method of claim 1, wherein the constraint for the spin coated surface to not intersect the substrate surface is enforced while solving the smoothing algorithm and not thereafter.

4. The method of claim 1, wherein the mathematical model further includes a constraint to maintain a constant volume of the material.

5. The method of claim 1, wherein the constraint for the spin coated surface to not intersect the substrate surface is a function of a volume of the material.

6. The method of claim 1, wherein the processing parameters include at least one of exposure time, mask feature sizes, coat settings, and stepper settings.

7. The method of claim 2, wherein the constraint for the spin coated surface to not intersect the substrate surface is enforced while solving the smoothing algorithm and not thereafter.

8. The method of claim 2, wherein the mathematical model further includes a constraint to maintain a constant volume of the material.

9. The method of claim 2, wherein the constraint for the spin coated surface to not intersect the substrate surface is a function of a volume of the material.

10. The method of claim 2, wherein the processing parameters include at least one of exposure time, mask feature sizes, coat settings, and stepper settings.

* * * * *